Sept. 26, 1950  G. W. JOHNSON  2,523,305
CONVEYER TYPE WASHING MACHINE
Filed Dec. 5, 1947  3 Sheets-Sheet 1

INVENTOR
GEORGE W. JOHNSON
BY Hyde, Meyer, Baldwin & Doran
ATTORNEYS

Sept. 26, 1950 G. W. JOHNSON 2,523,305
CONVEYER TYPE WASHING MACHINE
Filed Dec. 5, 1947 3 Sheets-Sheet 3

INVENTOR
GEORGE W. JOHNSON
BY
Hyde, Meyer, Baldwin & Doran
ATTORNEYS

Patented Sept. 26, 1950

2,523,305

UNITED STATES PATENT OFFICE 2,523,305

CONVEYER TYPE WASHING MACHINE

George W. Johnson, Cincinnati, Ohio, assignor to The American Laundry Machinery Company, Cincinnati, Ohio, a corporation of Ohio Application December 5, 1947, Serial No. 789,953

12 Claims. (Cl. 68—53)

This invention relates to work tumbling or agitating apparatus, for use in drying, washing, dry cleaning or otherwise treating any kind of work. While useful for treating any kind of material, for convenience the invention is here shown and described for use in cleaning or drying articles made of textile fabrics, such as sheets, pillowcases, or other flat work, or underwear, shirts or other articles of wearing apparel.

One object of the invention is to provide an improved machine which thoroughly and efficiently agitates the work, and which may be actuated to unload the work when the tumbling operation is concluded.

Another object is to utilize the same operating device both for agitation and unloading.

Still another object is to simplify the driving and operating mechanism.

A further object is to provide an improved agitating machine including an enclosing casing and an agitator therein, the casing being tiltable to a position in which operation of the agitator unloads or discharges the work.

Another object is to provide an improved machine of the class described, embodying an unloading agitator, but also provided with means for causing the flow of a stream of drying air over the work while the agitator is in operation, but also enabling said agitator again to be used for work discharge purposes, as aforesaid.

Finally, another object of the invention is generally to provide a relatively simple machine which operates efficiently both for agitating and unloading purposes, which is easily controlled, and which also is durable and not likely to get out of order in service.

Further objects of the invention in part are obvious and in part will appear more in detail hereinafter.

In the drawings, Fig. 1 is a front elevation of one form of machine embodying the invention;

Figs. 1 and 2 illustrate the invention embodied in a machine adapted for use either in a laundry for washing clothes or in a dry cleaning plant for cleaning articles with a volatile solvent.

Figure 1:
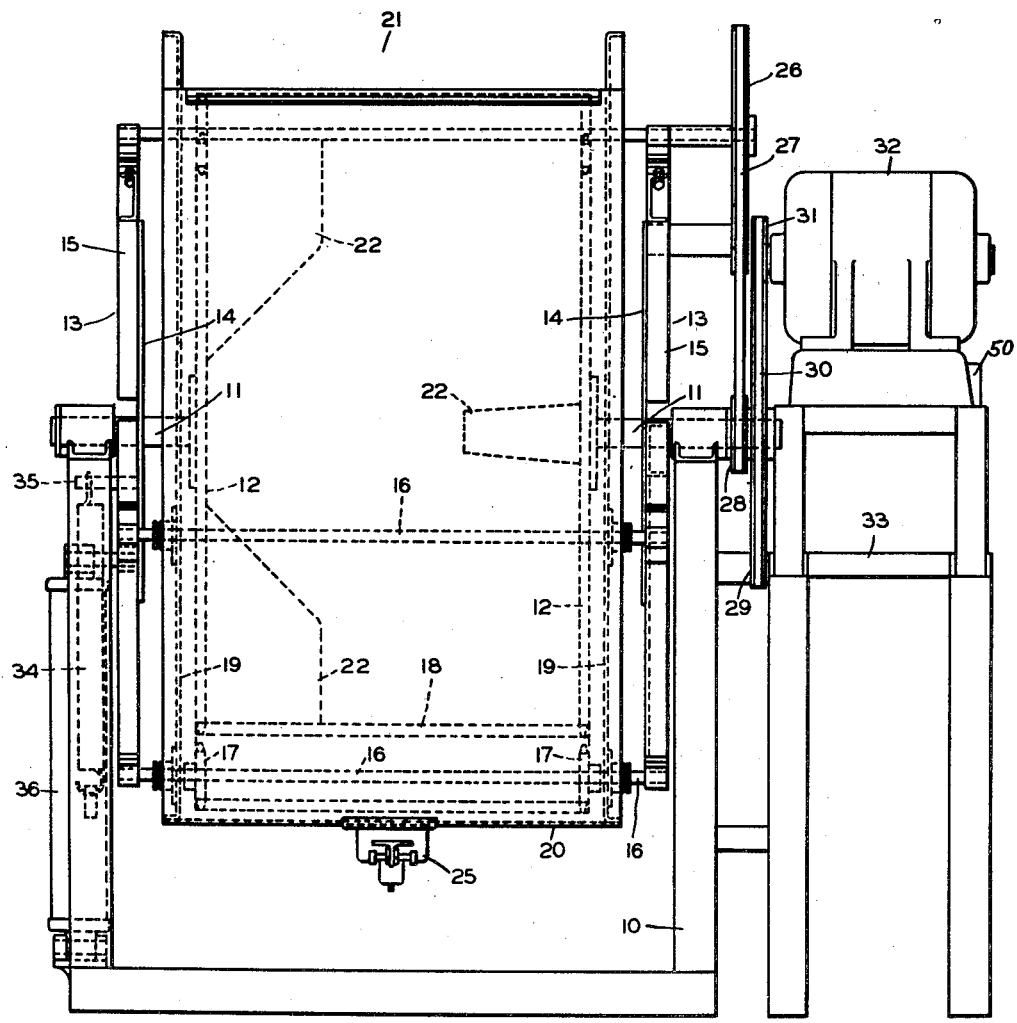

The machine shown embodies a suitable frame 10 in which are journalled two alined shaft members 11 in the form of end trunnions supporting large circular imperforate end heads in the form of sprocket members 12. The shafts are journalled and rotate in bearing openings in two end members 13, each consisting of a central plate or disc 14 and a series (five being shown) of radiating spokes 15. Spokes in the two members 13 are opposite or in alinement with each other, each pair having journalled in their outer ends a shaft 16 carrying two small sprockets 17, one at each end. At each end of the machine the several sprockets 12, 17 are in the same plane and the two sets of sprockets support an endless link belt or apron of any suitable form marked 18. The inner stretch of this belt, where it travels in engagement with the teeth of end heads 12, together with said end heads, forms the work receiving or holding pocket, the end bends or loops of the belt, and the two shafts 16 which support them, being spaced apart circumferentially of the heads 12 to provide the necessary opening to the work holding space.

Shafts 16 and the spiderlike end members in which they rotate support a casing or drum including end walls 19 and an outer wall 20, said casing fully enclosing the endless belt and its supporting sprockets and shafts, and being provided with a suitable opening 21, to provide access to the work feeding gap in the conveyor and the work agitating space within it.

Each end sprocket 12 is provided with two radially extending ribs or lifters 22, staggered so that those on one sprocket are midway of those on the other. As the sprockets rotate and the belt moves with them the work is carried up and dropped, with motion endwise of the chamber toward its opposite end, thus turning it over and vigorously agitating it.

When the machine is used for washing or dry cleaning, the link belt or apron of course should be perforate or foraminous in order to permit free flow through it of the liquid washing or cleaning agent.

Two curved guards, marked 23, 24, partly cover the end bends or loops of the conveyor belt and its large sprockets and prevent the work from traveling around the loops. One of these, 23, is hinged so that it can be swung out of the way when unloading the work, while the other is fixed to the casing.

A suitable drain valve 25, treadle operated, permits the liquid to be drained away.

Figure 2:
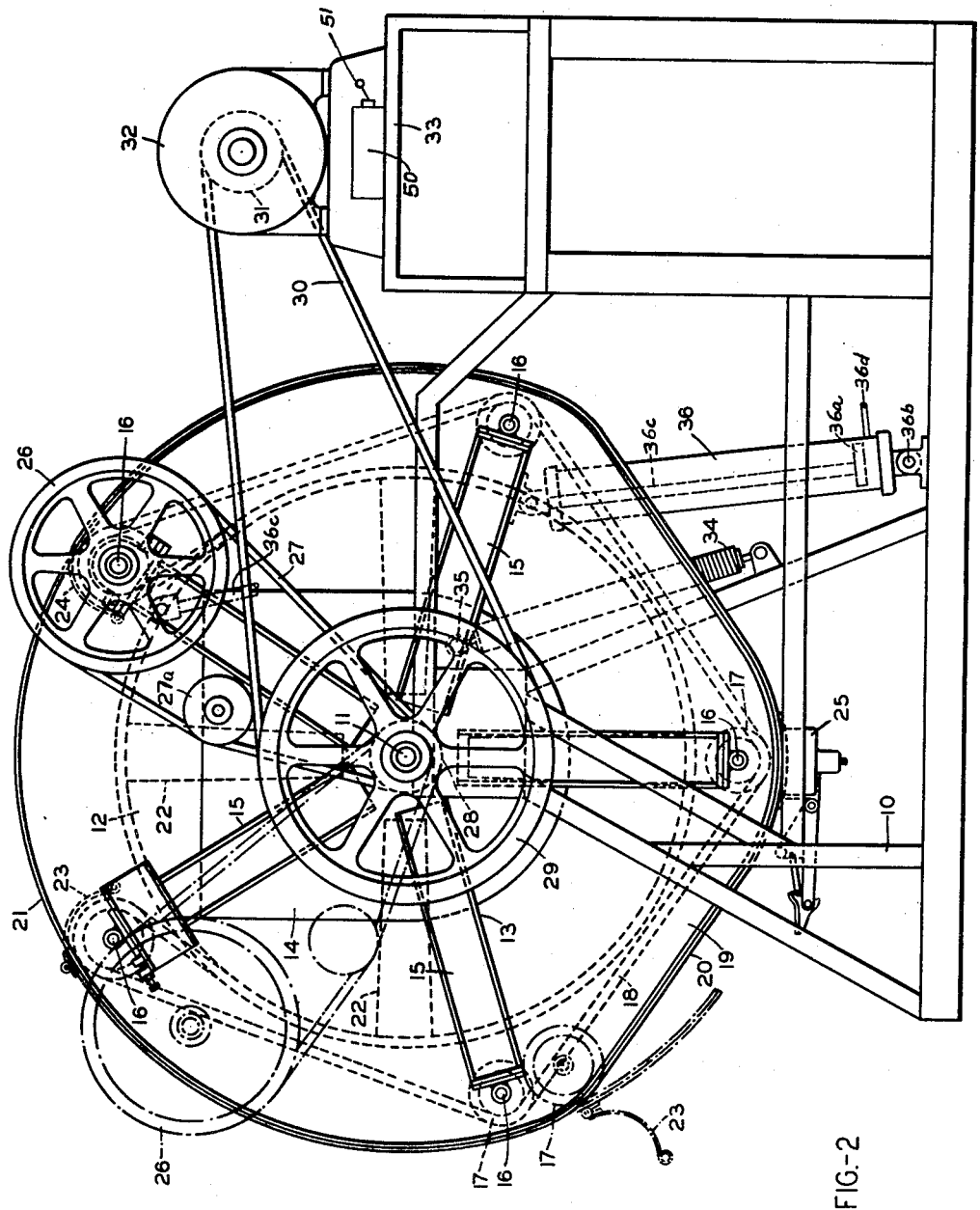
Fig. 2 is an end elevation from the right in Fig. 1.

One of the two upper shafts 16, that one at the right in Fig. 2, serves as the means by which said conveyor is driven. Said shaft, externally of the casing, is provided with a sprocket 26 from which an endless chain 27 passes over an idler sprocket 27a to a driving sprocket 28 journailed on shaft 11 and connected to a large sprocket 29 connected by chain 30 to a driving sprocket 31 on the shaft of a reversible electric motor 32 mounted on a stand or support 33. By suitable drum or other control, conventionally indicated at 50, Fig. 2, this motor may be caused to rotate intermittently in opposite directions for the agitating operation, and by manual control, as by switch 51, continuously in one direction, for the unloading operation, as will be readily understood without detailed description, since the control parts form no part of the present invention.

The casing 19, 20 together with all parts within it, normally occupies the position shown in Fig. 2, to which it is biased by a tension spring 34 extending from the frame to a pin 35 on one of the radiating spokes 15 of an end member 13. A fluid pressure servomotor 36 having a piston 36a is pivoted to the frame at 36b. Its rod 36c is connected to a suitable point on one of the end spokes 15. Fluid pressure is supplied to the motor through suitable pipe connections, such as conduit 36d.

The operation is as follows:

To charge or load the machine, the fluid pressure to motor 36 is turned on. The motor piston rod 36c moves up to the dotted line position, Fig. 2, turning the casing and its contained parts about 90° around the central axis bringing the two sets of sprockets 17 about which the end loops of the belt travel to new positions, one thereof shown in dot-dash lines, Fig. 2, thus moving the casing opening to the front and to a level convenient to the operator.

Then the work is loaded into the machine through said opening.

Now, the air pressure in the servomotor is released or evacuated and spring 34 returns the parts to the operating position shown in full lines Fig. 2, with the charging opening at the top. Guard 23 is swung into operating position, if not already there.

Next, with the drain valve closed, suitable washing detergent or volatile solvent is run into the washing chamber.

Then the current is turned on to motor 32 and its controller 50 is set into operation. Thereupon the conveyor is driven first in one direction and then in the other, intermittently for short periods, as is usual in washing or cleaning machines. The effect is to thoroughly and violently agitate the work, which is lifted by the lifters 22 and dropped along inclined lines so that it travels back and forth from end to end of the washing chamber. The endless belt carries some liquid up with it, raining it down over the tumbling work.

After the desired washing period has elapsed the motor is stopped, the liquid is drained off, fluid pressure is turned on to the servomotor and the casing and other parts are returned to the former loading and unloading position. Then by manual operation of switch 51 motor 32 is made to run continuously in one direction, to wit, that direction which turns the large sprockets 12 clockwise in Fig. 2. The conveyor then acts as an unloading device, carrying the work up to and ejecting it through the casing opening into a tub, basket or other container provided for the purpose. The machine is then loaded again and the operation is repeated.

Figure 3:
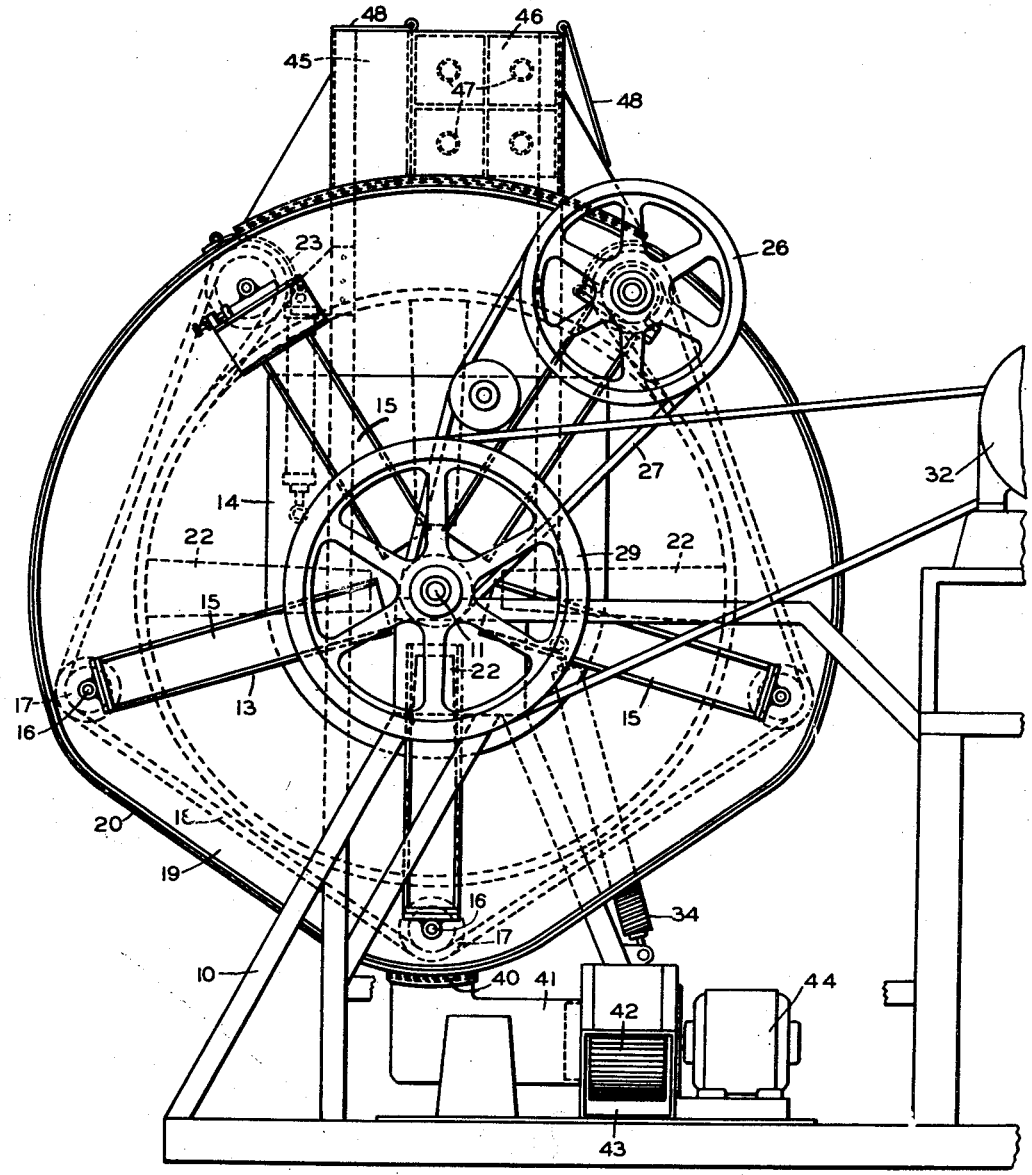
Fig. 3 is a view corresponding to Fig. 2, showing another embodiment of the invention.

Fig. 3 illustrates similar mechanism adapted for use as a drying tumbler in which damp work is agitated and dried.

So far as the swinging casing, the endless belt or conveyor and their manner of operation are concerned, these are much like those before described and require little description. No drain valve, of course, is necessary. But the lower portion of the outer casing wall, where the drain valve of Fig. 2 is located, is here provided with an opening 40 adapted by swinging motion of the casing to be moved or adjusted into or out of registration with the inlet opening to a suction conduit 41 communicating with a fan or blower 42 having an outlet 43 and operated by motor 44.

At the top of the machine, the wide opening to the casing, through which it is loaded or unloaded, is likewise adapted, by swinging motion of the casing to be adjusted into or out of registration with two air supply passages, one, marked 45, for cold air, communicating directly with the outside air, and the other, marked 46 for hot air, also so communicating but being provided with finned steam heating coils 47. Both passages are provided with hinged doors or dampers 48 which may be opened to various positions to vary the proportions of hot and cold air and thus secure any desired mixture of the two and produce or maintain any desired temperature in the drying chamber.

Suitable gaskets not shown close and seal all joints around the edges of the casing openings, such as around shafts 16, when the parts are in operating or drying position.

The operation of this form is as follows:

By action of the servomotor the drum or casing is first shifted to loading position, as before, the work holding pocket is loaded, and then the servomotor is deenergized to permit the drum to return to its operating position shown.

The driving motor is started and the endless belt is again rotated or caused to travel intermittently first in one direction and then in the other.

Fan motor 44 is started and a current of drying air is passed through the drying chamber. This usually is at first hot air, until the work is dried, and then cold air to cool it.

When the work is dried and cooled the drum is again shifted to unloading position and by operation of the conveyor continuously in the proper direction the work is ejected from the machine.

It should be observed that discharge of the load, after washing, does not necessarily require continuous travel of the endless belt in one direction only. During intermittent reversal of the direction of travel of the belt, such as during washing, the belt usually travels in each direction a distance equal to several times (say 3, 4 or more times) the total peripheral dimension of one of the end heads or sprockets 12. Therefore, when the drum has been shifted to unloading position, the ordinary reversing operation of the belt will usually unload the work during that phase of belt travel which is in the unloading direction. If all of the work is not ejected during one cycle, the remaining pieces are ejected during the next cycle, and when the belt is traveling in the opposite direction the work is merely held in the washing chamber.

It should further be noted that the lifting and tumbling members 22 are of special form, each attached to one of the end head sprockets 12, those on one head being staggered with reference to those on the other. These members are of generally plate or rib form, each extending from the sprocket on which it is mounted toward, but stopping short of, the other sprocket. Also, the general planes of these lifting plates are radial, their outer edges lying closely adjacent to the belt, while their inner edges are inclined and lie outwardly from the central axis. Since they are attached to sprockets definitely related, by the belt, to sprockets on the shaft 16, the latter being journalled in the drum end heads, the lifting members always remain in the same staggered relation to each other.

Both forms of the invention are simple, easy to control and operate, and very efficient for their intended purposes.

Other advantages of the invention will be apparent to those skilled in the art.

What I claim is:

1. Work agitating apparatus of the character described, comprising a generally drum form casing provided with end plates and an outer wall having a charging opening, said drum being mounted to swing about a horizontal axis, and a combined work agitator and conveyor mounted within said drum for swinging motion as a unit therewith, comprising end heads, an endless belt having two end loops spaced apart to provide a gap opposite said charging opening and outer and inner stretches, the latter mounted upon and traveling with the peripheral portions of the end heads, and a series of parallel shaft members supporting the end loops and outer stretch of said belt.

2. Work agitating apparatus of the character described, comprising a generally drum form casing provided with end plates and an outer wall having a charging opening, said drum being mounted to swing about a horizontal axis, and a combined work agitator and conveyor mounted within said drum for swinging motion as a unit therewith, comprising end heads, an endless belt having two end loops spaced apart to provide a gap opposite said charging opening and outer and inner stretches, the latter mounted upon and traveling with the peripheral portions of the end heads, a series of parallel shaft members supporting the end loops and outer stretch of said belt, and operating means connected to said drum for shifting it either to a loading position with said charging opening at the front or to an operating position with said opening at the top.

3. Work agitating apparatus of the character described, comprising a generally drum form casing provided with end plates and an outer wall having a charging opening, said drum being mounted to swing about a horizontal axis, and a combined work agitator and conveyor mounted within said drum for swinging motion as a unit therewith, comprising end heads, an endless belt having two end loops spaced apart to provide a gap opposite said charging opening and outer and inner stretches, the latter mounted upon and traveling with the peripheral portions of the end heads, a series of parallel shaft members supporting the end loops and outer stretch of said belt, and means for causing rotation of said end heads and endwise travel of said belt.

4. Work agitating apparatus of the character described, comprising a generally drum form casing provided with end plates and an outer wall having a charging opening, said drum being mounted to swing about a horizontal axis, and a combined work agitator and conveyor mounted within said drum for swinging motion as a unit therewith, comprising end heads, an endless belt having two end loops spaced apart to provide a gap opposite said charging opening and outer and inner stretches, the latter mounted upon and traveling with the peripheral portions of the end heads, a series of parallel shaft members supporting the end loops and outer stretch of said belt, means for causing rotation of said end heads and endwise travel of said belt, and operating means connected to said drum for shifting it either to a loading position with said charging opening at the front or to an operating position with said opening at the top.

5. Work agitating apparatus of the character described, comprising a generally drum form casing provided with end plates and an outer wall having a charging opening, said drum being mounted to swing about a horizontal axis, and a combined work agitator and conveyor mounted within said drum for swinging motion as a unit therewith, comprising end heads, an endless belt having two end loops spaced apart to provide a gap opposite said charging opening and outer and inner stretches, the latter mounted upon and traveling with the peripheral portions of the end heads, end plates mounted externally of the drum, one at each end thereof, for rotation about the drum axis, and a series of parallel shafts rotatably supported upon said end plates and extending through the drum and therein provided with means for supporting the end loops and outer stretch of said belt.

6. Work agitating apparatus of the character described, comprising a generally drum form casing provided with end plates and an outer wall having a charging opening, said drum being mounted to swing about a horizontal axis, and a combined work agitator and conveyor mounted within said drum for swinging motion as a unit therewith, comprising end heads, an endless belt having two end loops spaced apart to provide a gap opposite said charging opening and outer and inner stretches, the latter mounted upon and traveling with the peripheral portions of the end heads, a series of parallel shaft members supporting the end loops and outer stretch of said belt, and means operatively connected to one of said shafts for rotating the same in any position to which the drum may be swung.

7. Work agitating apparatus of the character described, comprising a generally drum form casing provided with end plates and an outer wall having a charging opening, said drum being mounted to swing about a horizontal axis, and a combined work agitator and conveyor mounted within said drum for swinging motion as a unit therewith, comprising end heads, an endless belt having two end loops spaced apart to provide a gap opposite said charging opening and outer and inner stretches, the latter mounted upon and traveling with the peripheral portions of the end heads, a series of parallel shaft members supporting the end loops and outer stretch of said belt, operating means connected to said drum for shifting it either to a loading position with said charging opening at the front or to an operating position with said opening at the top, and means operatively connected to one of said shafts for rotating the same in either of said positions of the drum.

8. Work agitating apparatus of the character described, comprising a generally drum form casing provided with imperforate end plates and an outer wall having a charging opening, said drum being mounted to swing about a horizontal axis, and a combined work agitator and conveyor mounted within said drum for swinging motion as a unit therewith, comprising end heads, an endless belt having two end loops spaced apart to provide a gap opposite said charging opening and outer and inner stretches, the latter mounted upon and traveling with the peripheral portions of the end heads, a series of parallel shaft members supporting the end loops and outer stretch of said belt, the end plates and outer wall of said drum being imperforate, except for said charging opening, and thereby adapted to hold liquid in which work supported by said belt is agitated.

9. Work agitating apparatus of the character described, comprising a generally drum form casing provided with imperforate end plates and an outer wall having a charging opening, said drum being mounted to swing about a horizontal axis, and a combined work agitator and conveyor mounted within said drum for swinging motion as a unit therewith, comprising end heads, an endless belt having two end loops spaced apart to provide a gap opposite said charging opening and outer and inner stretches, the latter mounted upon and traveling with the peripheral portions of the end heads, a series of parallel shaft members supporting the end loops and outer stretch of said belt, the end plates and outer wall of said drum being imperforate, except for said charging opening, and thereby adapted to hold liquid in which work supported by said belt is agitated, and a drain valve in the outer wall of said drum casing opposite the charging opening thereto.

10. Work agitating apparatus of the character described, comprising a generally drum form casing provided with end plates and an outer wall having a charging opening, said drum being mounted to swing about a horizontal axis, and a combined work agitator and conveyor mounted within said drum for swinging motion as a unit therewith, comprising end heads, an endless belt having two end loops spaced apart to provide a gap opposite said charging opening and outer and inner stretches, the latter mounted upon and traveling with the peripheral portions of the end heads, a series of parallel shaft members supporting the end loops and outer stretch of said belt, the outer wall of said drum being provided with an opening opposite the charging opening, and two conduits, one above and the other below the axis of drum rotation, with which the drum openings may be caused to register and by means of which a current of drying air may be caused to flow through the drum.

11. Work agitating apparatus of the character described, comprising a generally drum form casing provided with end plates and an outer wall having a charging opening, said drum being mounted to swing about a horizontal axis, and a combined work agitator and conveyor mounted within said drum for swinging motion as a unit therewith, comprising end heads, an endless belt having two end loops spaced apart to provide a gap opposite said charging opening and outer and inner stretches, the latter mounted upon and traveling with the peripheral portions of the end heads, a series of parallel shaft members supporting the end loops and outer stretch of said belt, and a plurality of work lifting and tumbling members mounted upon each of the end heads, each such member being of generally rib form lying in a radial plane and extending from its end head toward but stopping short of the other end head.

12. Work agitating apparatus of the character described, comprising a generally drum form casing provided with end plates and an outer wall having a charging opening, said drum being mounted to swing about a horizontal axis, and a combined work agitator and conveyor mounted within said drum for swinging motion as a unit therewith, comprising end heads, an endless belt having two end loops spaced apart to provide a gap opposite said charging opening and outer and inner stretches, the latter mounted upon and traveling with the peripheral portions of the end heads, a series of parallel shaft members supporting the end loops and outer stretch of said belt, and a plurality of work lifting and tumbling members mounted upon each of the end heads, each such member being of generally rib form lying in a radial plane and extending from its end head toward but stopping short of the other end head, those on one end head being staggered with reference to those on the other.

GEORGE W. JOHNSON.

REFERENCES CITED

The following references are of record in the file of this patent:

UNITED STATES PATENTS

| Number | Name | Date |
|---|---|---|
| 1,224,191 | Medgyes | May 1, 1917 |
| 1,656,528 | Millard | Jan. 17, 1928 |
| 2,292,787 | Johnson | Aug. 11, 1942 |
| 2,308,420 | Hoopes | Jan. 12, 1943 |
| 2,412,763 | Baker | Dec. 17, 1946 |
| 2,447,802 | Hirsch | Aug. 23, 1948 |

FOREIGN PATENTS

| Number | Country | Date |
|---|---|---|
| 531,346 | England | Jan. 2, 1941 |